United States Patent [19]

Schaham

[11] Patent Number: 5,192,856
[45] Date of Patent: Mar. 9, 1993

[54] AUTO FOCUSING BAR CODE READER
[75] Inventor: Moshe Schaham, West Hartford, Conn.
[73] Assignee: An Con Genetics, Inc., Melville, N.Y.
[21] Appl. No.: 615,367
[22] Filed: Nov. 19, 1990
[51] Int. Cl.⁵ .............................................. G06K 7/10
[52] U.S. Cl. ...................................... 235/462; 235/472
[58] Field of Search .................................. 235/472, 462

[56] References Cited
U.S. PATENT DOCUMENTS

| | | | |
|---|---|---|---|
| 4,136,821 | 1/1979 | Sigiura et al. ................... | 235/462 |
| 4,368,978 | 1/1983 | Tsunekawa et al. . | |
| 4,409,470 | 10/1983 | Shepard et al. . | |
| 4,528,444 | 7/1985 | Hara et al. ................... | 235/472 X |
| 4,581,761 | 4/1986 | Ichinokawa et al. . | |
| 4,652,750 | 3/1987 | Eastman et al. ................ | 235/472 X |
| 4,667,089 | 5/1987 | Shirakabe et al. . | |
| 4,686,359 | 8/1987 | Yokoi et al. . | |
| 4,703,186 | 10/1987 | Nakayama et al. . | |
| 4,710,615 | 12/1987 | Meyers . | |
| 4,736,095 | 4/1988 | Shepard et al. . | |
| 4,742,220 | 5/1988 | Beyor . | |
| 4,745,484 | 5/1988 | Drexler et al. . | |
| 4,758,717 | 7/1988 | Shepard et al. . | |
| 4,762,985 | 8/1988 | Imai et al. . | |
| 4,793,812 | 12/1988 | Sussman et al. . | |
| 4,800,257 | 1/1989 | Johner . | |
| 4,800,270 | 1/1989 | Blais . | |
| 4,808,804 | 2/1989 | Kirchever et al. . | |
| 4,816,661 | 3/1989 | Krichever et al. . | |
| 4,818,847 | 4/1989 | Hara et al. ................... | 235/472 X |
| 4,831,275 | 5/1989 | Drucker . | |
| 4,845,350 | 7/1989 | Shepard et al. . | |
| 4,912,496 | 3/1990 | Tamada et al. . | |
| 4,920,255 | 4/1990 | Gabeler . | |
| 4,999,661 | 3/1991 | Ueno et al. ................... | 354/402 |

Primary Examiner—John W. Shepperd
Attorney, Agent, or Firm—McCormick, Paulding & Huber

[57] ABSTRACT

A device for reading and interpreting bar codes, which illuminates the bar code with a fixed elliptical beam and images the reflected beam onto a CCD array. The black and white bar information is detected by the electronically scanned elements of a linear CCD array. The limited operational range, determined by the optical system depth of focus, is enhanced significantly to a useful operational range by automatically focusing the image of the bar code on the CCD array.

19 Claims, 1 Drawing Sheet

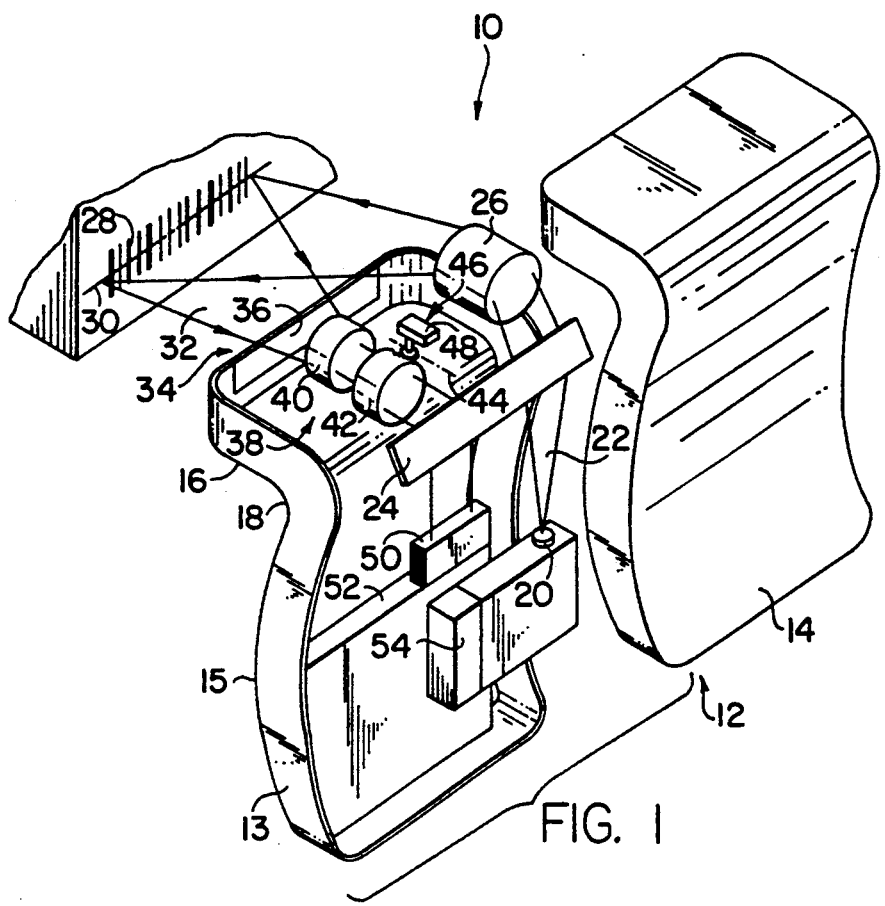
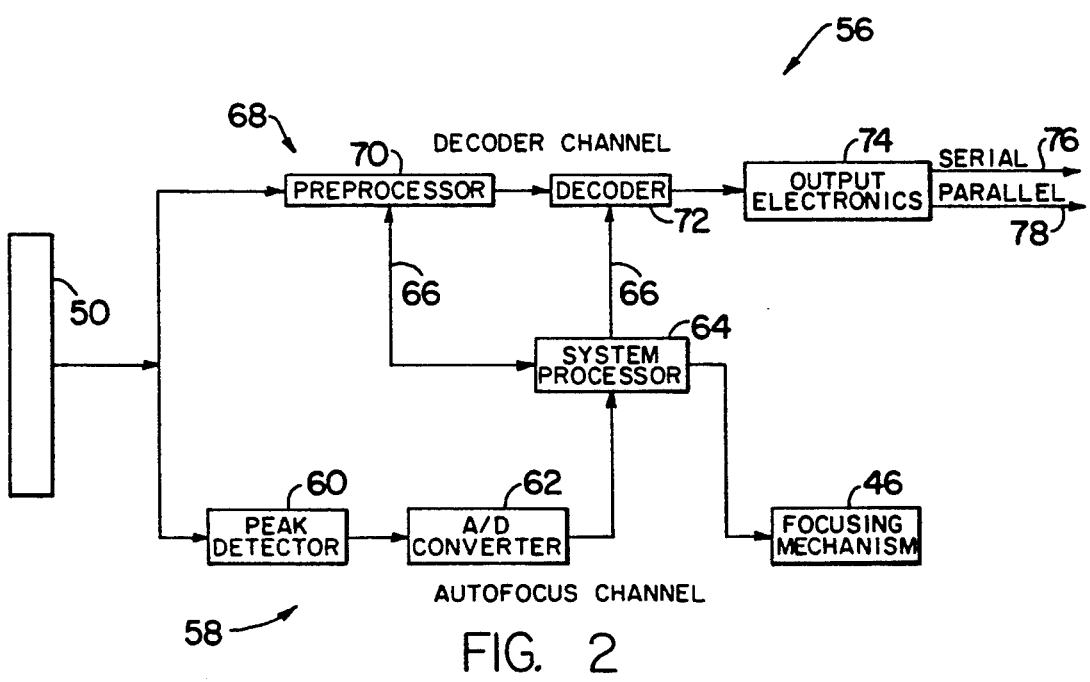

AUTO FOCUSING BAR CODE READER

TECHNICAL FIELD

The present invention relates to optical bar code readers in general, and more particularly to hand held optical bar code readers that provide for automatic focusing.

BACKGROUND OF THE INVENTION

Known hand held bar code readers are of two types. The first is a "pen" type or contacting wand which outputs a focused light beam and detects a return beam at the pen tip. The pen must be manually scanned across the bar code. The second is a "gun" type self scanning bar code reader which uses a focused laser beam moved across a target bar code by a rotating mirror. Examples of self scanning bar code readers are disclosed in U.S. Pat. Nos. 4,409,470, 4,736,095, 4,758,717, 4,808,804, 4,816,661 and 4,845,350 assigned to Symbol Technologies Inc. of Bohemia, N.Y.

The motors used by rotating mirror scanners have a short lifetime and their reading speeds are limited because of mirror motion to less than a hundred readings per second. An alternative self scanning technique for reading bar codes that eliminates the need for the mechanical scanning by imaging the bar code onto a linear CCD detector array. The elements in the CCD array are then electronically scanned to yield a signal that is proportional to the reflected light intensity of the bar code.

This technique eliminates the need for mechanical scanning and offers higher reading speeds in excess of ten times those of mechanical scanners. A major drawback with non-moving self-scanners' problem is that, the F number of the detector optics must be chosen to enable sufficient light to be presented to the CCD array, yielding a correspondingly small depth of field. This limits the usefulness of those type of devices to reading only bar codes at fixed distances.

SUMMARY OF THE INVENTION

An object of the present invention is to provide a self scanning bar code reader having a large depth of field without scanning optical components.

An other object of the present invention is to provide a hand held bar code reader with a superior scanning speed yet with a large operational range in a design that combines the use of a linear detector array for reading the bar code, as well as a detector for an autofocus system.

Still another object of the present invention to provide a light weight hand held bar code reader with a minimum of internal moving parts to increase the life of the device and decrease electrical energy consumption.

It is a further object of the present invention to provide a self scanning bar code reader of the foregoing type that is easily adapted to read two dimensional bar codes.

According to the present invention, an apparatus for use in reading a bar code having a spaced sequence of electromagnetically absorptive and reflective regions along a scan axis at a distance from a target includes a housing having a port for sending and receiving electromagnetic beams; an optical train positioned within a housing cavity including fixed beam shaping optics for receiving and spreading a beam to exit the housing port and irradiate the bar code completely along the scan axis. Auto-focusing optics receive a reflected beam from the bar code and adjust the focal point of the reflected beam exiting therefrom. A motor adjusts the position of the auto-focusing optics in dependence on received control signal. A sensor receives the focused reflected beam from the auto-focusing optics and provides electrical signal equivalents thereof. A processor receives the reflected beam electrical signal equivalents and generates the auto-focusing optics control signals in accordance with a method comprising the steps of: detecting maximum and minimum signal magnitudes in the signal equivalents; digitizing the maximum and minimum signal magnitudes in the signal equivalents and computing a contrast value for the maximum and minimum signal magnitudes in the signal equivalents. The method also includes the steps of generating the control signals to move the auto-focusing optics by an amount inversely proportional to the magnitude of the contrast value. The processor repeats the method until the control signals have a minimum value a preselected value and wherein the contrast value is greater than less than a threshold value. Thereafter, the processor further decodes the reflected beam signal equivalents with a method comprising the steps of: digitizing said signal equivalents to generate an alternating sequence of greater and lesser signal equivalent magnitudes, each having a spatial width corresponding to the bar width sequence; measuring the spatial width of the signal equivalent magnitudes; compensating for variations in the spatial width of the signal equivalent magnitudes; and generating an output signal corresponding to an equivalent bar code digit sequence.

BRIEF DESCRIPTION OF THE DRAWING

FIG. 1 is a simplified schematic illustration of a self scanning bar code reader provided by the present invention.

FIG. 2 is a simplified illustration of a portion of a processor for use with the reader of FIG. 1.

DESCRIPTION OF THE PREFERRED EMBODIMENT

Referring now to FIG. 1 there is shown in simplified schematic form an exploded view of a self-scanning bar code reader 10 provided according to the present invention. The scanner 10 comprises a housing 12 having a base 13 and a cover 14 that have major and minor portions 15, 16 respectively. The housing portions are connected through an angle 18. Since the reader is designed to be used manually, the geometry of the housing is selected to optimize ease of use by a human operator. The major portion houses an electromagnetic source 20, preferably an infrared light emitting diode. A specific example is the SFH481 LED from SIEMENS which can generate over 10 mW of power at a wavelength of 950 nm in continuous operation. This value can be further increased by a factor of three if the LED is driven only during the short period of time necessary for the CCD array to detect the image of the bar code. The choice of a LED has several advantages. It is a compact, low cost and energy efficient light source. Furthermore, its defined wavelength allows its use with a narrow bandwidth optical filter to prevent most of the background light from reaching the detector.

The light beam 22 from the diode is presented to a mirror 24 which turns the light beam through the included angle 18 and presents it to beam forming optics 26 which include known collimating and cylindrical lenses. The beam 22 exits the housing at a port in the housing and irradiates the bar code 28 located on a target object some distance from the reader. The beam forming optics are configured to evenly illuminate the bar code across its width along a scan axis 30. The bar code is conventional, and comprises a series of dark absorptive and white reflective bands whose widths varies. The variation in bar width contains the coded information. The reflected beam carries the coded information in the form of intensity variation due to the difference in reflection between the dark and white bands.

The electromagnetic radiation reflected from the target comprises a reflected beam 32 received by the reader at a port 34. It is preferable to include a filter 36 having a narrow bandpass to exclude all radiation other than that of the reflected beam. The reflected, filtered beam enters the housing and is presented to auto-focusing optics 38 of a type known in the art. The optics 38 is comprised of a first lens 40 and a second imaging lens 42 that is moved along an axis 44 by means of a focusing mechanism 46. The focusing mechanism includes a motor 48 and such other gears and the like as are necessary to accomplish the beam focusing detailed herein. The auto-focusing optics is similar to known ones used in cameras which can be modified for shorter operational range if necessary. The auto-focusing lenses are followed by a cylindrical lens which focuses the reflected beam along a vertical axis.

The reflected beam is then provided to the turning mirror and to a linear CCD detector array 50. The reflected beam is focussed by the cylindrical lens onto the CCD array to extend thereacross. The CCD array is scanned in a conventional fashion to provide video electrical signal equivalents of the imaged bar code with a voltage amplitude proportional to the intensity of the light. The number of active elements in the CCD array have to be greater than the number of resolution elements in the bar code. A signal processor that is part of a controller 52 performs the dual functions of generating motor command signals to optimize the bar code image and decoding the same. The present reader utilizes the linear CCD array as (1) an optical signal contrast detector for the autofocus optics and (2) a high speed optical scanner capable of scanning a bar code with a mechanically stationary optical system. The reader also includes a power supply 54 for the processor and the focusing mechanism.

The present reader uses the autofocus optics to eliminate the shortcomings of the prior art devices that do not actively focus the image of the target and thus have a limited depth of field. Each sequence of focusing and reading is initiated by a trigger on the housing that is pushed by the operator. Before performing a reading of the bar code, the reader automatically changes the position of the lens (or equivalently, the CCD array) along the optical axis, until the sharpest focus of the reflected beam on to CCD array is achieved as indicated by the highest contrast CCD signal. The processor utilizes the signal from the CCD array as detailed in FIG. 2

FIG. 2 is a simplified schematic illustration 56 of a portion of the controller. The controller is configured in two channels, both of which receive the signal output from the CCD array. In an autofocus channel 58 the analog video output signal of the CCD array is processed to provide feedback information to the focusing mechanism. The autofocus channel determines contrast in the CCD signal. Peak detector electronics 60 detects the minimum and maximum voltages of the CCD array output signal. These peak values are sampled and digitized by an analog to digital converter (A/D) 62 and used by the processor 64 to calculate the optical contrast of the reflected beam. The contrast of the signal is calculated by the following equation:

$$\text{CONTRAST} = \frac{\sum\limits^{N} Vmax - Vmin}{N}$$

Where Vmax, Vmin are digitized adjacent pairs of peak voltages. N is the number of those pairs across the bar code.

An algorithm executed by the processor generates a drive signal for the focusing mechanism in a binary search form to complete the focusing sequence in the minimum number of lens movements. An initial value of contrast is first determined. The imaging lens is driven in an arbitrary direction by an amount which is inversely proportional to the contrast. A new contrast value is then calculated by the processor which provides drive signals to the focusing mechanism. This process is repeated in binary steps until there is a convergence. Each time that the imaging lens is moved into a new position, a new sample of the CCD array signal is acquired.

The criteria for optimum imaging lens position is determined when the change from the last calculated contrast value is smaller than a preselected value and where the last calculated contrast value is larger than a threshold value selected to ensure the signal is able to be decoded. The optimum imaging lens position is typically achieved in less than one second. Once the lens focal position is reached, a signal is sent on line 66 to the decoder channel 68 to start decoding the signal. A user option is available to disable the focusing mechanism and move the lens manually into a fixed focus position, for applications where the bar code is always at a fixed distance from the device.

After the optimum focusing position has been reached, the output signal of the CCD array is digitized by the processor to determine the bar code information. In the decoder channel, the signal is digitized after a "READY" signal has been issued by the autofocus channel. The signal is digitized by preprocessor 70 by comparing it to a reference level. The digitized CCD array signal is stored in memory associated with the preprocessor which measures the width of the "bar" portions of the CCD array signal and outputs a version thereof calibrated to include "corrected" timing to compensate for distortions caused by reading the bar code such as intensity variations in width of the "bars" due to slight variations in the reader to target distance and optical compression from non-flat target surfaces.

The preprocessor is implemented through the use of specially dedicated electronic hardware of a known type to allow fast, "real time" processing. A decoder 72 such as a Hewlett-Packard Model HBCR-2010 decoder is a commercially available component designed specifically for the function of decoding bar code signals. The decoder has built-in automatic code recognition and supports a wide selection of industry standard codes. The decoder outputs signals to processing output electronics 74 indicative of the decoded bar code in the form of ASCII characters via a serial and/or parallel ports 76, 78.

The operational concept of most known self-scanning bar code readers is manifested in their shape; that is a handgun operated by a trigger. When pushing the trigger, a laser beam is "shot" towards a target bar code. In contrast, the present self scanning bar code reader more closely resembles a camera in that it generates an image of its target on a linear detector array rather than on film. Like many of today's cameras, it includes an autofocus device and, an illumination device. Unlike a camera, it has to be aimed and operated with one hand without the operator obtaining the target through a viewer. For convenience of operation the reader 10 is shaped somewhat like an electric shaver with a trigger. The present reader also differs from most cameras in its shorter operational range (2 to 20 inches).

The preferred light source in the embodiment is an infrared light emitting diode (LED). Under certain ambient light conditions, the bar code can be detected by the present reader without an active light source, however, the reading reliability is significantly enhanced by illuminating the bar code with a source of electromagnetic radiation as detailed above. Using a light source that generates an invisible (IR) beam enables the use of a filter to remove most of the ambient light before entering the housing thereby improving the signal to noise ratio. The preferred reader also includes a feedback mechanism for the operator such as an indicator light that turns on each time sufficient light energy is received by the CCD array and/or a successful scan occurs. A LED is the light source of choice because it can provide the necessary optical power and it is small, light weight, inexpensive, efficient and easy to operate.

Since the beam output from the reader is used to illuminate a cross section of the bar code, the collimation requirements thereof are not stringent, and the high degree of collimation provided by a laser beam does not provide any performance advantages. On the contrary, laser light would, in certain conditions, create undesirable interference phenomena.

In selecting a source of electromagnetic radiation, attenuation along the optical path must also be considered. Attenuation factors include:
(a) the reflectivity of the bar code surface;
(b) the angle of incidence of the beam on the surface;
(c) the "spillover" of the bar code image with respect to the size of the detector in the vertical dimension;
(d) the F number of the receiving optics;
(e) the power loss through all of the optical elements; and
(f) the power loss due to the non-responsive sections of the CCD array between its active elements.

After exiting the reader, the beam is a collimated beam with an elliptical cross section that illuminates only a cross section of the target and an average optical power distribution of 5 mm/cm. The optical power received by the CCD array is approximately 50 uw/cm, which is attenuated by a factor of 100 from the original LED beam power. The elliptical shape of the beam provided to the target is in accord with the original geometry of the light emitting portion of the LED. The electromagnetic radiation is generated in the LED's PN junction in an area approximately 5 um wide and 0.1 um high. The beam therefrom has an elliptical shape with significantly more divergence in the horizontal plane than in the vertical plane. A collimator lens is preferably employed to provide a collimated beam in the horizontal dimension to a cylindrical lens that further collimates the beam only in the vertical dimension. Due to the narrow bandwidth of the light source ($+-50$ nm), the filter used can block a large percentage of the background light, making the device insensitive to large variation in lighting conditions and equally operational in the dark or under bright sunshine.

The CCD linear array is the detector of the device, which is still quite sensitive at the wavelength transmission of the infrared light source (950 nm). The number of elements of the CCD array has to be large enough so that the resolution of the detector is higher than the resolution of the smallest code detected. A typical, inexpensive device like the TC103 (TEXAS INSTRUMENT), has 2000 elements across which is about an order of magnitude greater than the number of resolution elements across the bar code. This provides the device the capability to read a wide variety of code sizes within the large operational range of the device. An exposure time of 2 ms-4 ms is sufficient to get adequate output signal levels and allows to read code at a rate of 250-500 times per second, which is about an order of magnitude faster than the leading device presently on the market. The capability has a significance in some industrial applications and can be utilized when the distance of the device to the bar code is fixed.

The device described here can be further enhanced, based on the same operational principles, described herein. A cordless device can be made according to the present invention by adding an infrared transmitter to replace the device communication lines and a rechargeable battery to replace the device input power lines. Secondly a two dimensional code reader, can be made by replacing the linear CCD array with an area array and by modifying the optical train accordingly. In this configuration the device is capable of reading two dimensional codes.

Similarly, although the invention has been shown and described with respect to a preferred embodiment thereof, it would be understood by those skilled in the art that other various changes omissions and additions thereto maybe made without departing from the spirit and scope of the present invention.

I claim:
1. An apparatus for use in reading a bar code having a spaced alternating sequence of electromagnetically absorptive and reflective regions along a scan axis at a distance from a target, said apparatus comprising:
   a housing adapted to be manually placed in communication with said bar code having a port for sending and receiving electromagnetic beams;
   an electromagnetic signal source located within said housing for providing an electromagnetic illumination beam at a selected frequency and intensity;
   an optical train positioned within said housing including
   fixed beam shaping optics for receiving and spreading said illumination beam to exit said housing port and irradiating said bar code completely along said scan axis with said housing at a single position relative to said target, and
   auto-focusing optics for receiving a reflected beam from said bar code and adjusting the focal point of said reflected beam exiting therefrom;
   a motor means for adjusting the position of said auto-focusing optics in dependence on received control signals;

a sensor means for receiving said focused reflected beam from said auto-focusing optics and for providing electrical signal equivalents thereof;

a processor means mounted within said housing, receiving said reflected beam electrical signal equivalents, for first generating said auto-focusing optics control signals in accordance with a method comprising the steps of:

detecting maximum and minimum signal magnitudes in said signal equivalents;

digitizing said maximum and minimum signal magnitudes in said signal equivalents;

computing a contrast value for said maximum and minimum signal magnitudes in said signal equivalents;

generating said control signals to move said auto-focusing optics by an amount inversely proportional to the magnitude of said contrast value;

said processor means repeating said method until said control signals have a minimum value wherein the difference between said contrast value and a previously computed contrast value is less than a preselected value and wherein said contrast value is greater than a threshold value;

said processor means, after generating said control signal minimum value, further for subsequently decoding said reflected beam signal equivalents with a method comprising the steps of:

digitizing said signal equivalents;

measuring the width of portions of said digitized signal equivalents along said scan axis corresponding to said electromagnetically absorptive and reflective regions to generate bar code width sequence signals; and generating an output signal corresponding to an equivalent bar code digit sequence from said bar code width sequence signals.

2. The apparatus of claim 1 wherein said electromagnetic signal source comprises a light emitting diode (LED) that emits infrared radiation.

3. The apparatus of claim 1 wherein said detector means comprises a linear array of charge coupled devices (CCD).

4. The apparatus of claim 1 wherein said processor means further comprises a means for halting said auto-focusing control signal generation and for adjusting said auto-focus optics position manually.

5. The apparatus of claim 1 further comprising a filter for passing to said detector means a selected frequency band of said reflected radiation.

6. The apparatus of claim 1 further comprising a radio transmitter means for transmitting said signals indicative of said measured bar width sequence.

7. The apparatus of claim 1 wherein said optical train further comprises a cylindrical lens.

8. The apparatus of claim 1 wherein said optical train further comprises a cylindrical lens for linearly focusing said reflected radiation onto said detector means.

9. The apparatus of claim 8 wherein said cylindrical lens receives and linearly focuses said electromagnetic beam to span said bar code.

10. The apparatus of claim 1 wherein said optical train further comprises a lens for collimating said electromagnetic beams.

11. The apparatus of claim 1 wherein said bar code further comprises a second spaced alternating sequence of electromagnetically absorptive and reflective regions along a second scan axis substantially perpendicular to said first scan axis;

said beam shaping optics further comprises a means for irradiating said bar code completely along said second scan axis, said auto-focusing optics for receiving a reflected beam from said bar code along said second scan axis and adjusting the focal point of said reflected beam exiting therefrom, said detector means further comprises a means for receiving said bar code second scan axis reflected beam and providing electrical signal equivalents thereof;

said processor means further comprises a means for decoding said second scan axis reflected beam signal equivalents with a method comprising the steps of:

digitizing said second scan axis reflected beam signal equivalents;

measuring the width of portions of said digitized second scan axis reflected beam signal equivalents along said scan axis corresponding to said second spaced alternating sequence of electromagnetically absorptive and reflective regions to generate second bar code width sequence signals;

generating an output signal corresponding to an equivalent bar code digit sequence from said bar code width sequence signals.

12. The apparatus of claim 11 wherein said processor further comprises a means for providing an indicator signal after said bar code has been successfully decoded.

13. The apparatus of claim 1 wherein said processor further comprises a means for providing an indicator signal after said bar code has been successfully decoded.

14. The apparatus of claim 1 wherein said processor means further comprises a means for comparing said measured bar code width sequence with a plurality of bar code width sequences stored in a processor means memory and for providing recognition signals identifying the one of said stored bar code width sequences corresponding to said measured bar code width sequence.

15. The apparatus of claim 1 further comprising preprocessor means for calibrating said measured widths of said bar code width sequence signals, thereby compensating for distortions in said bar code width sequence signals caused by non-flat surfaces.

16. An apparatus for use in reading a bar code having a spaced alternating sequence of electromagnetically absorptive and reflective regions along a scan axis at a distance from a target, said apparatus comprising:

a housing adapted to be manually placed in communication with said bar code having major and minor portions with an acute included angle therebetween, said minor portion having a port for sending and receiving electromagnetic beams;

an electromagnetic signal source located within said housing major portion for providing an illumination beam of electromagnetic radiation at a selected frequency and intensity;

an optical train positioned within said housing including fixed beam shaping optics for receiving and spreading said beam to exit said housing port and irradiating said bar code completely along said scan axis with said housing at a single position relative to said target;

auto-focusing optics for receiving a reflected beam from said bar code along said scan axis and adjusting the focal point of said reflected beam exiting therefrom, and beam turning optics for turning said electromagnetic beams through said housing acute angle;

a motor means positioned in said housing minor portion for adjusting the position of said auto-focusing optics in dependence on received control signals;

a sensor means positioned in said housing major portion for receiving said focused reflected beam from said auto-focusing optics and for providing electrical signal equivalents thereof;

a processor means positioned in said housing major portion and receiving said reflected beam electrical signal equivalents, for first generating said auto-focusing optics control signals in accordance with a method comprising the steps of:

detecting maximum and minimum signal magnitudes in said signal equivalents;

digitizing said maximum and minimum signal magnitudes in said signal equivalents;

computing a contrast value for said maximum and minimum signal magnitudes in said signal equivalents;

generating said control signals to move said auto-focusing optics by an amount inversely proportional to the magnitude of said contrast value;

said processor means repeating said method until said control signals have a minimum value wherein the difference between said contrast value and a previously computed contrast value is less than a preselected value and wherein said contrast value is greater than a threshold value;

said processor means, after generating said control signal minimum value, further for subsequently decoding said reflected beam signal equivalents with a method comprising the steps of:

digitizing said signal equivalents;

measuring the width of portions of said digitized signal equivalents along said scan axis corresponding to said electromagnetically absorptive and reflective regions to generate bar code width sequence signals; and generating an output signal corresponding to an equivalent bar code digit sequence from said bar code width sequence signals.

17. The apparatus of claim 16 wherein said optical train further comprises a lens for collimating said electromagnetic beams.

18. The apparatus of claim 10 wherein said bar code further comprises a second spaced alternating sequence of electromagnetically absorptive and reflective regions along a scan axis substantially perpendicular to said first scan axis and wherein:

said beam shaping optics further comprises a means for irradiating said bar code completely along said second scan axis, said auto-focusing optics for receiving a reflected beam from said bar code along said second scan axis and adjusting the focal point of said reflected beam exiting therefrom, said detector means further comprises a means for receiving said bar code second scan axis reflected beam and providing electrical signal equivalents thereof;

said processor means further comprises a means for decoding said second scan axis reflected beam signal equivalents with a method comprising the steps of:

digitizing said second scan axis reflected beam signal equivalents;

measuring the width of portions of said digitized second scan axis reflected beam signal equivalents along said scan axis corresponding to said second spaced alternating sequence of electromagnetically absorptive and reflective regions to generate second bar code width sequence signals;

generating an output signal corresponding to an equivalent bar code digit sequence from said bar sequence signals.

19. The apparatus of claim 16 further comprising preprocessor means for calibrating said measured widths of said bar code width sequence signals, thereby compensating for distortions in said bar code width sequence signals caused by non-flat surfaces.

* * * * *